United States Patent
Kobayashi et al.

[11] Patent Number: 5,978,380
[45] Date of Patent: Nov. 2, 1999

[54] APPARATUS FOR ESTABLISHING COMMON SIGNAL CHANNEL

[75] Inventors: Kazutoshi Kobayashi; Shinjirou Fujii; Shinichi Araya; Akira Obata; Sachiko Ishimoto, all of Yokohama, Japan

[73] Assignee: Fujitsu Limited, Kanagawa, Japan

[21] Appl. No.: 08/844,322

[22] Filed: Apr. 18, 1997

[30] Foreign Application Priority Data

Oct. 17, 1996 [JP] Japan ................................. 8-274674

[51] Int. Cl.⁶ .............................. H04J 3/12; H04L 12/26
[52] U.S. Cl. .................... 370/410; 370/468; 370/524; 379/230
[58] Field of Search .................................. 370/229, 230, 370/232, 233, 234, 235, 236, 395, 431, 437, 379, 409, 410, 522, 524, 465, 468; 379/230

[56] References Cited

U.S. PATENT DOCUMENTS

| 4,009,344 | 2/1977 | Flemming | 455/12.1 |
| 5,253,247 | 10/1993 | Hirose et al. | 370/232 |
| 5,528,589 | 6/1996 | Nishidai | 370/235 |
| 5,541,987 | 7/1996 | Topper et al. | 370/236 |
| 5,764,626 | 6/1998 | Vandervort | 370/232 |

FOREIGN PATENT DOCUMENTS

| 62-036934 | 2/1987 | Japan . |
| 5-168073 | 7/1993 | Japan . |
| 5-183645 | 7/1993 | Japan . |
| 6-037910 | 2/1994 | Japan . |

*Primary Examiner*—Hassan Kizou
*Assistant Examiner*—Daniel Previl
*Attorney, Agent, or Firm*—Helfgott & Karas, P.C.

[57] ABSTRACT

An apparatus establishes a common signal channel with a flexible channel capacity for effective utilization of the total traffic capacity between two exchanges or stations which are interconnected by the common signal channel. A traffic detecting unit in one of the exchanges detects a traffic volume in the common signal channel between the exchanges. Based on the detected traffic volume, a channel capacity change determining unit determines whether a channel capacity to which the common signal channel is set needs to be changed or not and determines a new channel capacity to be established for the common signal channel if the channel capacity needs to be changed. If the channel capacity to which the common signal channel is set needs to be changed, a channel capacity change executing unit executes a change in the channel capacity to which the common signal channel is set based on the established new channel capacity.

14 Claims, 13 Drawing Sheets

APPARATUS FOR ESTABLISHING COMMON SIGNAL CHANNEL

BACKGROUND OF THE INVENTION

1. Field of the Invention

The present invention relates to an apparatus for establishing a common signal channel, and more particularly to an apparatus for establishing a common signal channel for transmitting various control signals, between exchanges independently of a number of speech channels, the common signal channel being shared by the speech channels.

2. Description of the Related Art

Heretofore, it has been customary to establish a common signal channel for a No. 7 common channel signaling system in the broadband ISDN (B-ISDN) system by designating a certain channel among physical channels between exchanges with a VPI (Virtual Path Identifier) and a VCI (Virtual Channel Identifier) and producing settings in a routing table of an ATM switch thereby to connect the designated channel and a level-2 terminating device to each other.

Specifically, when a serviceman is to establish a common signal channel, the serviceman first determines a suitable physical channel to be used as the common signal channel, and a VPI and a VCI. Based on the information representing the determined physical channel, the VPI, and the VCI, the serviceman enters a command for establishing the common signal channel into a processor in an exchange. In response to the command, the processor initializes a level-2 terminating device and a level-1 terminating device, and sets the common signal channel to a desired channel capacity. Then, the processor produces settings in a routing table of an ATM switch for thereby connecting the level-2 terminating device and the level-1 terminating device to each other.

Since a common signal channel is established when the serviceman enters a command into the processor, a channel capacity to which the common signal channel is set is fixed and not variable. Therefore, when the traffic volume in the common signal channel increases, the common signal channel may possibly suffer congestion even if the traffic capacity between two exchanges or stations interconnected by the common signal channel is sufficiently large, with the result that some of control signals transmitted over the common signal channel may be lost. When such congestion occurs in the common signal channel, the quality of services available between such two exchanges or stations is lowered. The quality of services between the exchanges or stations is also lowered when the common signal channel is subject to a fault. Conversely, when the traffic volume in the common signal channel decreases, the traffic intensity or occupancy of the common signal channel is reduced, leaving an empty traffic volume unused in the common signal channel. However, such an empty traffic volume is not available for communication through the speech channels because the common signal channel is set to the fixed channel capacity.

SUMMARY OF THE INVENTION

It is an object of the present invention to provide an apparatus for establishing a common signal channel with a flexible channel capacity for effective utilization of the total traffic capacity between two exchanges or stations which are interconnected by the common signal channel.

To achieve the above object, there is provided in accordance with the present invention an apparatus for establishing a common signal channel for transmitting control signals, between exchanges independently of a number of speech channels, the common signal channel being shared by the speech channels. The apparatus includes traffic volume detecting means for detecting a traffic volume in the common signal channel, channel capacity change determining means for determining whether a channel capacity to which the common signal channel is set needs to be changed or not and determining a new channel capacity to be established, based on the traffic volume detected by the traffic volume detecting means, and channel capacity change executing means for executing a change in the channel capacity to which the common signal channel is set based on the established new channel capacity if the channel capacity to which the common signal channel is set needs to be changed as determined by the channel capacity change determining means.

The above object can also be accomplished by another apparatus for establishing a common signal channel for transmitting control signals, between exchanges independently of a number of speech channels, the common signal channel being shared by the speech channels. The apparatus includes traffic volume detecting means for detecting a traffic volume in a speech channel in a physical cable which accommodates the common signal channel and detecting a traffic volume in the common signal channel, channel capacity change determining means for determining whether a channel capacity to which the common signal channel is set needs to be changed or not and determining a new channel capacity to be established, based on the traffic volumes detected by the traffic volume detecting means, and channel capacity change executing means for executing a change in the channel capacity to which the common signal channel is set based on the established new channel capacity if the channel capacity to which the common signal channel is set needs to be changed as determined by the channel capacity change determining means.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
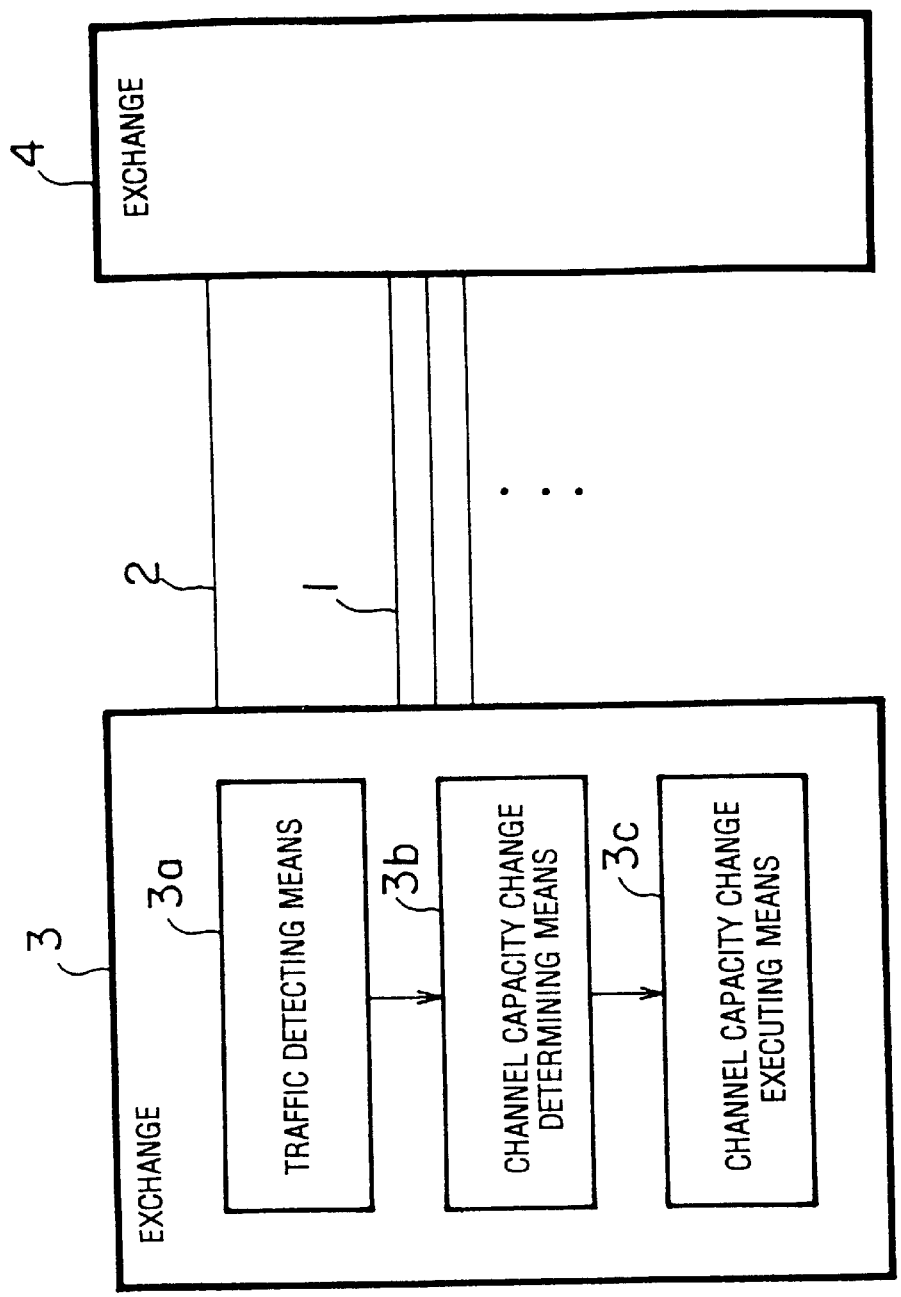
FIG. 1 is a block diagram of an apparatus for establishing a common signal channel according to a first embodiment of the present invention.

The principles of an apparatus for establishing a common signal channel according to a first embodiment of the present invention will be described below with reference to FIG. 1. As shown in FIG. 1, the apparatus according to the first embodiment of the present invention, which is incorporated in an exchange 3, comprises a traffic volume detecting means 3a for detecting a traffic volume in a common signal channel 2, a channel capacity change determining means 3b for determining whether a channel capacity to which the common signal channel 2 is set needs to be changed or not and also determining a new channel capacity to be established, based on the traffic volume detected by the traffic volume detecting mean 3a, and a channel capacity change executing means 3c for executing a change in the channel capacity to which the common signal channel 2 is set based on the established new channel capacity if the channel capacity to which the common signal channel 2 is set needs to be changed as determined by the channel capacity change determining means 3b.

The apparatus according to the first embodiment shown in FIG. 1 operates as follows: The traffic volume detecting means 3a detects a traffic volume in the common signal channel 2 between the exchange 3 and an exchange 4. Based on the traffic volume detected by the traffic volume detecting means 3a, the channel capacity change determining means 3b determines whether a channel capacity to which the common signal channel 2 is set needs to be changed or not and also determines a new channel capacity to be established if the channel capacity to which the common signal channel 2 is set needs to be changed. If the channel capacity to which the common signal channel 2 is set needs to be changed as determined by the channel capacity change determining means 3b, then the channel capacity change executing means 3c executes a change in the channel capacity to which the common signal channel 2 is set based on the established new channel capacity.

Therefore, a channel capacity to which the common signal channel 2 is to be set is determined depending on the traffic volume in the common signal channel 2, and the common signal channel 2 is set to the determined channel capacity. Consequently, various control signals to be transmitted through the common signal channel 2 are prevented from being lost due to congestion of the common signal channel 2, thereby preventing the quality of services available between the exchanges 3, 4 from being unduly lowered. Furthermore, an empty traffic volume remaining in the common signal channel 2 is available for communication through speech channels 1, i.e., the channel capacity between the exchanges 3, 4 can effectively be utilized.

Figure 2:
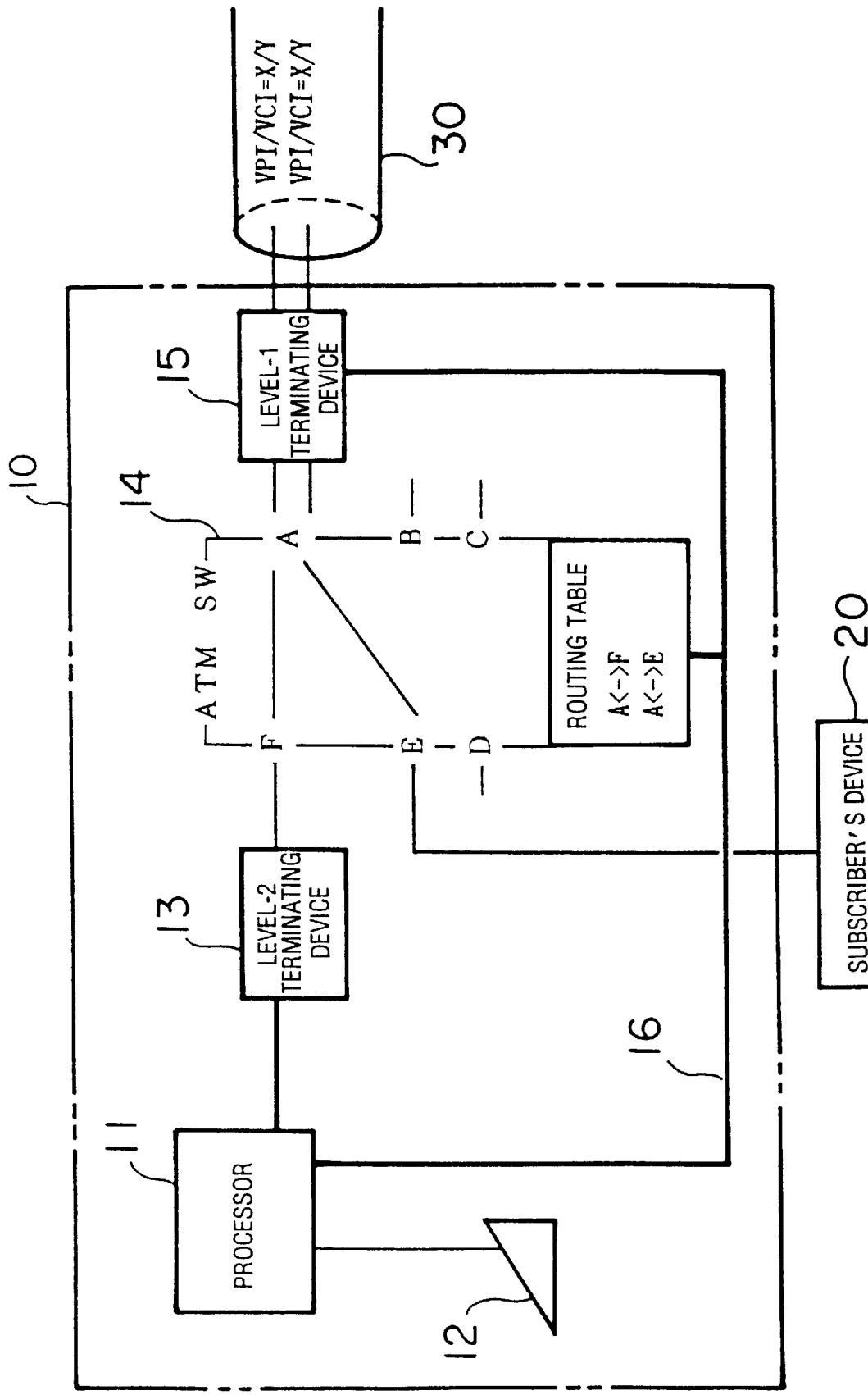
FIG. 2 is a block diagram of an exchange which incorporates the apparatus according to the first embodiment.

FIG. 2 shows in detail the exchange which incorporates the apparatus according to the first embodiment. The exchange, designated by the reference numeral 10 in FIG. 2, comprises a processor 11, an input device 12, a level-2 terminating device 13, an ATM switch 14, and a level-1 terminating device 15. In response to a command for establishing a common signal channel from the input device 12, the processor 11 operates to perform the functions of the traffic volume detecting means 3a, the channel capacity change determining means 3b, and the channel capacity change executing means 3c. The level-2 terminating device 13 terminates the level-2 function of a No. 7 common channel signal, and the level-1 terminating device 15 terminates an ATM cell. A subscriber's device 20 such as a telephone set is connected to the ATM switch 14. The ATM switch 14 connects the level-2 terminating device 13 and the level-1 terminating device 15 to each other and connects the subscriber's device 20 and the level-1 terminating device 15 to each other according to routing data in a routing table. The level-1 terminating device 15 is connected to an interoffice physical cable 30 which comprises a plurality of channels that are identified and distinguished by respective VPIs/VCIs. The processor 11 is connected to the level-2 terminating device 13, the ATM switch 14, and the level-1 terminating device 15. A common signal channel is connected from the level-2 terminating device 13 through the ATM switch 14 and the level-1 terminating device 15 to the interoffice physical cable 30, and speech channels are connected from the subscriber's device 20 through the ATM switch 14 and the level-1 terminating device 15 to the interoffice physical cable 30.

Figure 3:
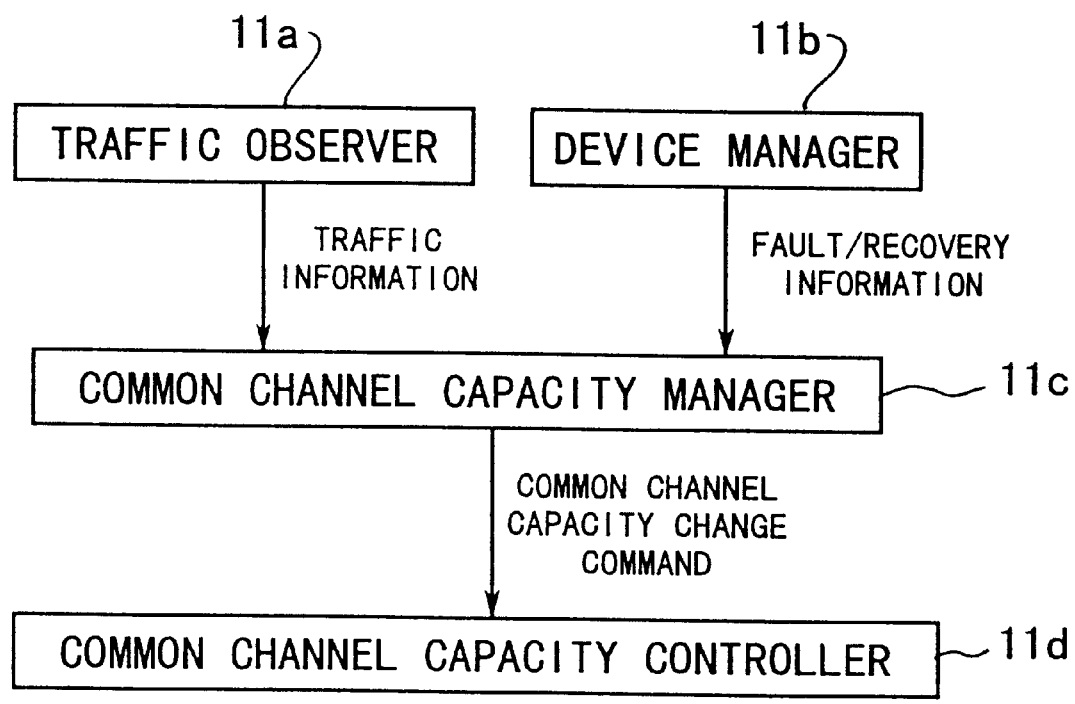
FIG. 3 is a block diagram of functions which are performed by a processor in the apparatus according to the first embodiment.

FIG. 3 shows in block form functions performed by the processor 11. As shown in FIG. 3, the functions performed by the processor 11 include a traffic observer 11a, a device manager 11b, a common channel capacity manager 11c, and a common channel capacity controller 11d. The traffic observer 11a observes the traffic of various sections related to the common signal channel, and transmits the observed traffic as traffic information to the common channel capacity manager 11c. The device manager 11b monitors statuses of various devices of the exchange 10, and transmits fault information and recovery information to the common channel capacity manager 11c when those devices suffer a fault and recover from a fault. The common channel capacity manager 11c compares the traffic information of the common signal channel which has been transmitted from the traffic observer 11a with a channel capacity to which the common signal channel is presently set, determines whether the channel capacity to which the common signal channel is presently set needs to be changed, and also determines a new channel capacity to be established if the channel capacity needs to be changed. The common channel capacity manager 11c transmits a common channel capacity change command indicative of the result of such a decision and a new channel capacity to be established to the common channel capacity controller 11d. Based on the data transmitted from the common channel capacity manager 11c, the common channel capacity controller 11d executes a change in the channel capacity (band) to which the common signal channel is presently set. Detailed operation of the common channel capacity manager 11c and the common channel capacity controller 11d will be described below with reference to FIGS. 4 and 5.

The traffic observer 11a corresponds to the traffic volume detecting means 3a shown in FIG. 1. The common channel capacity manager 11c corresponds to the channel capacity change determining means 3b shown in FIG. 1. The common channel capacity controller 11d corresponds to the channel capacity change executing means 3c shown in FIG. 1.

Figure 4:
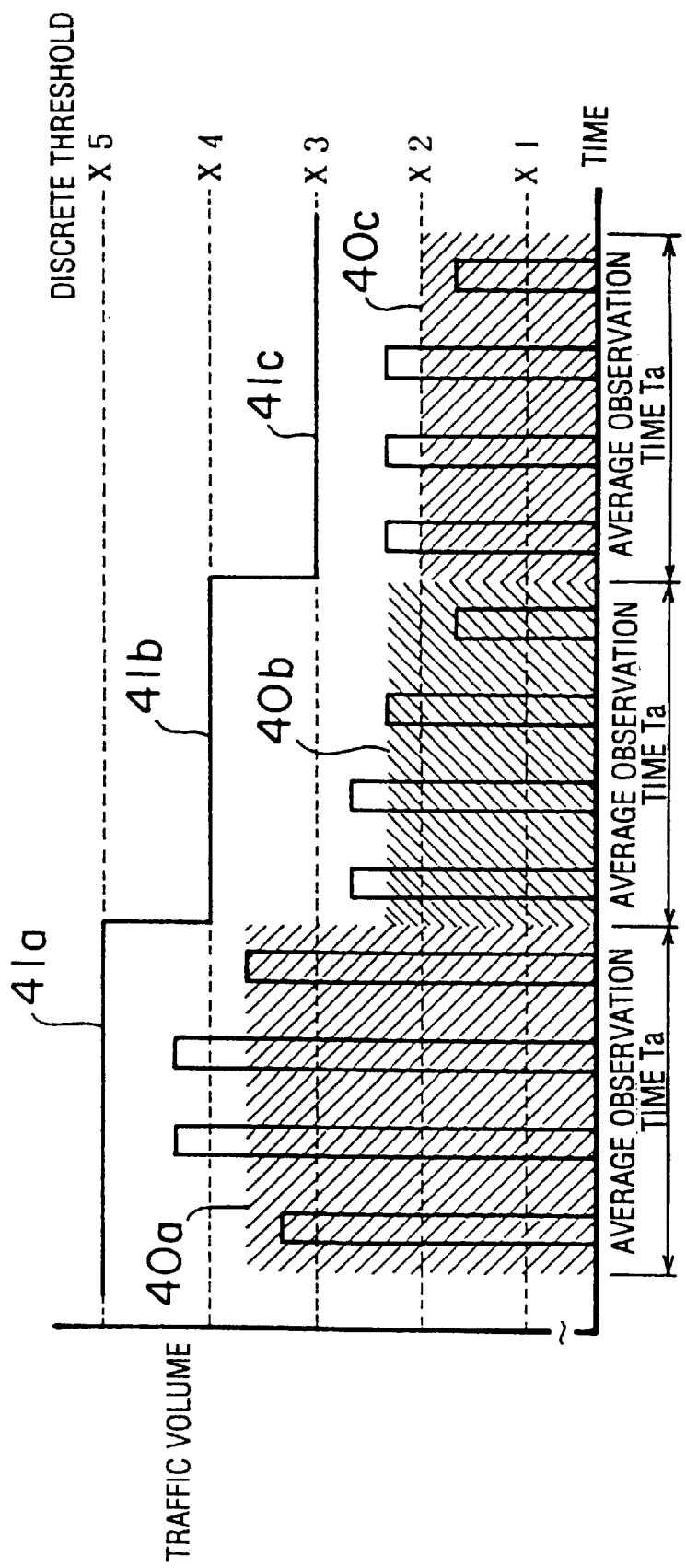
FIG. 4 is a diagram illustrating, in detail, of the manner in which a common channel capacity manager in the apparatus according to the first embodiment operates.

FIG. 4 shows in detail the manner in which the common channel capacity manager 11c operates. As shown in FIG. 4, when supplied with the traffic information from the traffic observer 11a, the common channel capacity manager 11c averages the traffic volume represented by the supplied traffic information over an average observation time Ta, producing an average value 40a, and determines which one of regions defined by discrete thresholds X1~X5 the average value 40a belongs to. In the illustrated embodiment, the average value 40a belongs to the region between the thresholds X3, X4. After the region to which the average value 40a belongs has been determined, the common channel capacity manager 11c selects a larger one of the thresholds X3, X4, i.e., the threshold X4. The common channel capacity manager 11c then compares the selected threshold X4 with a channel capacity 41a (corresponding to the threshold X5) to which the common signal channel 2 is presently set. If the selected threshold X4 differs from the channel capacity 41a, then the common channel capacity manager 11c decides that the channel capacity to which the common signal channel 2 is presently set needs to be changed, and designates the selected threshold X4 as a channel capacity to be newly established. Since the selected threshold X4 differs from the channel capacity 41a in this illustrated embodiment, the common channel capacity manager 11c designates the threshold X4 as a channel capacity 41b to be newly established. Thereafter, the common channel capacity manager 11c similarly determines an average value 40b, selects the threshold X3 based on the average value 40b, and determines the threshold X3 as a channel capacity 41c to be newly established.

Figure 5:
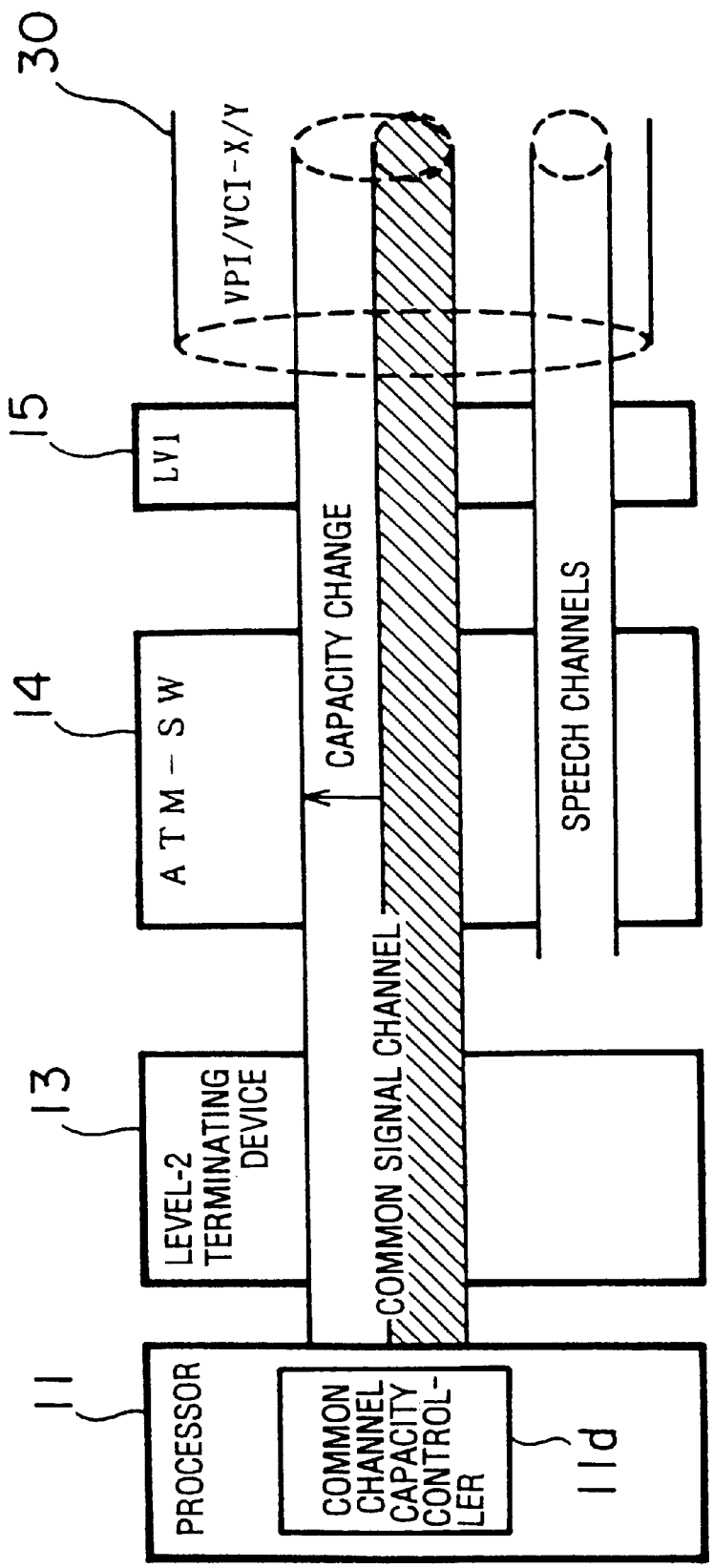
FIG. 5 is a diagram illustrating, in detail, of the manner in which a common channel capacity controller in the apparatus according to the first embodiment operates.

FIG. 5 shows in detail the manner in which the common channel capacity controller 11d operates. As shown in FIG. 5, if supplied with a decision that the channel capacity to which the common signal channel 2 is presently set needs to be increased from the common channel capacity manager 11c, then the common channel capacity controller 11d checks a remaining empty traffic volume which is not currently used for the speech channels 1 and the common signal channel 2 in the interoffice physical cable 30 which accommodates the common signal channel 2. If the remaining empty traffic volume is equal to or greater than the difference between the channel capacity to be newly established and the presently established channel capacity, then the common channel capacity controller 11d increases the presently established channel capacity by the remaining empty traffic volume, thereby attaining a new channel capacity for the common signal channel 2. Conversely, if supplied with a decision that the channel capacity to which the common signal channel 2 is presently set needs to be decreased from the common channel capacity manager 11c, then the common channel capacity controller 11d reduces the presently established channel capacity to a new channel capacity.

According to the first embodiment, as described above, a new channel capacity to which the common signal channel is to be set is determined depending on the average traffic volume in the common signal channel, and the channel capacity to which the common signal channel is presently set is changed into conformity with the new channel capacity thus determined. Consequently, the common signal channel can be set to a necessary and sufficient channel capacity at all times, and the channel capacity between the stations or exchanges can effectively be utilized.

Since such a change in the channel capacity to which the common signal channel is presently set is simply a capacity change within the same interoffice physical cable, the capacity change can quickly be effected.

In the first embodiment, the channel capacity to which the common signal channel is presently set is controlled based on the average traffic volume in the common signal channel. Therefore, if the traffic volume is subjected to a burst increase, it may possibly exceed the established channel capacity. However, the apparatus according to the first embodiment may be incorporated into a system with a relatively low interoffice traffic intensity or occupancy where the interoffice physical cable is assumed to have a relatively large empty traffic volume. In such an application, the traffic volume for the common signal channel which is in excess of the channel capacity to which the common signal channel is set can be saved by the empty traffic volume. In the event that call control signals are rejected from the common signal channel because the traffic exceeds the channel capacity to which the common signal channel is set, since the number of interoffice calls is relatively small in the system, any call losses resulting from the rejection of such call control signals are believed to be few enough not to cause any practical problems.

An apparatus for establishing a common signal channel according to a second embodiment of the present invention will be described below.

The apparatus according to the second embodiment has a hardware arrangement similar to that of the apparatus according to the first embodiment shown in FIGS. 2 and 3. However, the common channel capacity manager in the processor of the apparatus according to the second embodiment operates in a manner different from the common channel capacity manager 11c in the processor 11 of the apparatus according to the first embodiment. The components of the apparatus according to the second embodiment which are structurally and functionally identical to those of the apparatus according to the first embodiment will not be described in detail below, and only operation of the common channel capacity manager in the processor of the apparatus according to the second embodiment will be described below.

Figure 6:
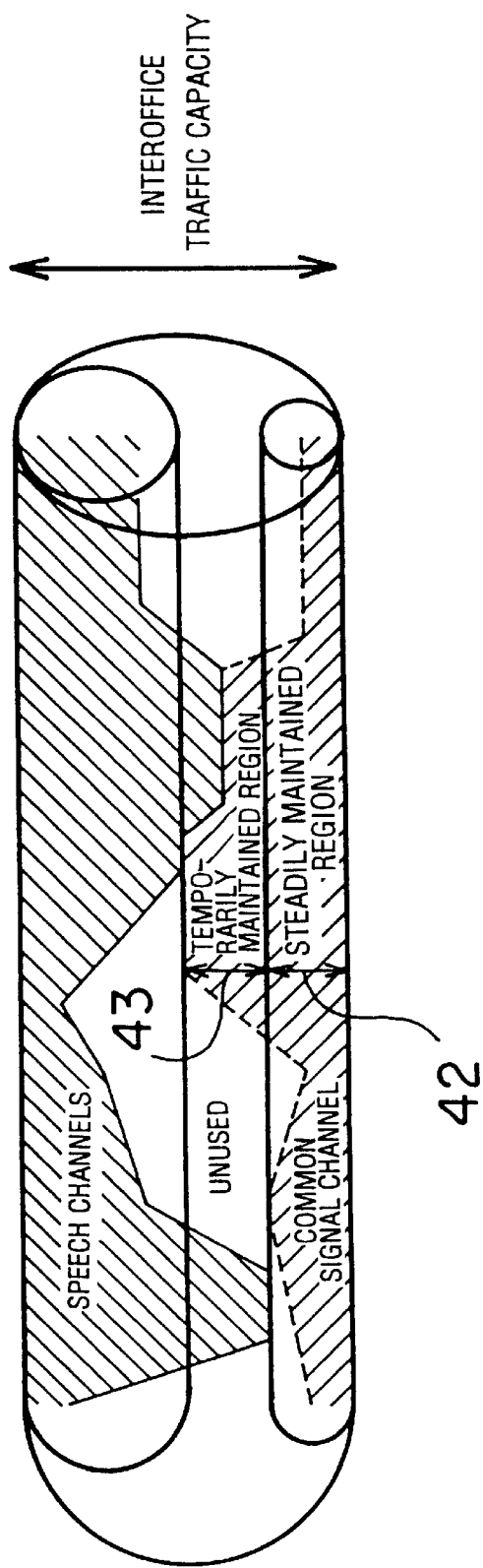
FIG. 6 is a diagram illustrative of the principles of operation of a common channel capacity manager in an apparatus for establishing a common signal channel according to a second embodiment of the present invention.

FIG. 6 shows the principles of operation of the common channel capacity manager in the apparatus according to the second embodiment of the present invention. In the first embodiment, the common channel capacity manager 11c may possibly cause problems when the traffic volume is subjected to a burst increase or the apparatus is incorporated in a system with a relatively high interoffice traffic intensity or occupancy. According to the second embodiment, however, the common channel capacity manager can operate normally when the traffic volume is subjected to a burst increase or the apparatus is incorporated in a system with a relatively high interoffice traffic intensity or occupancy.

As shown in FIG. 6, an interoffice channel capacity is divided into a segment for use by speech channels, a segment for use by a common signal channel, and a remaining segment which is not currently used. The remaining segment may be used by the speech channels and the common signal channel. When the speech channels and the common signal channel compete for the remaining segment, the speech channels have priority to use the remaining segment. The segment for use by the common signal channel includes a steadily maintained region 42 and a temporarily maintained region 43. The steadily maintained region 42 is a region whose capacity will not be allotted even if the speech channels are unable to have a necessary channel capacity. The temporarily maintained region 43 is a region whose capacity will be allotted to the speech channels if the speech channels are unable to have a necessary channel capacity. The temporarily maintained region 43 is established in the remaining segment of the interoffice channel capacity. The channel capacity of the steadily maintained region 42 is not fixed, but is variable at all times.

Insofar as the traffic volume in the common signal channel is kept within the steadily maintained region 42, communications through the common signal channel are guaranteed. If the traffic volume in the common signal channel bursts, and the common signal channel requires a temporarily large channel capacity, then the common signal channel maintains an extra channel capacity as a non-priority channel capacity in the temporarily maintained region 43. The extra channel capacity maintained in the temporarily maintained region 43 may be transferred to the speech channels when the traffic volume in the speech channels increases. However, if it is determined that the extra channel capacity maintained in the temporarily maintained region 43 is to be kept as a priority channel capacity for the common signal channel, then the steadily maintained region 42 is enlarged to hold the extra channel capacity.

Operation of the common channel capacity manager according to the second embodiment of the present invention based on the above principles will be described below with reference to FIG. 7.

Figure 7:
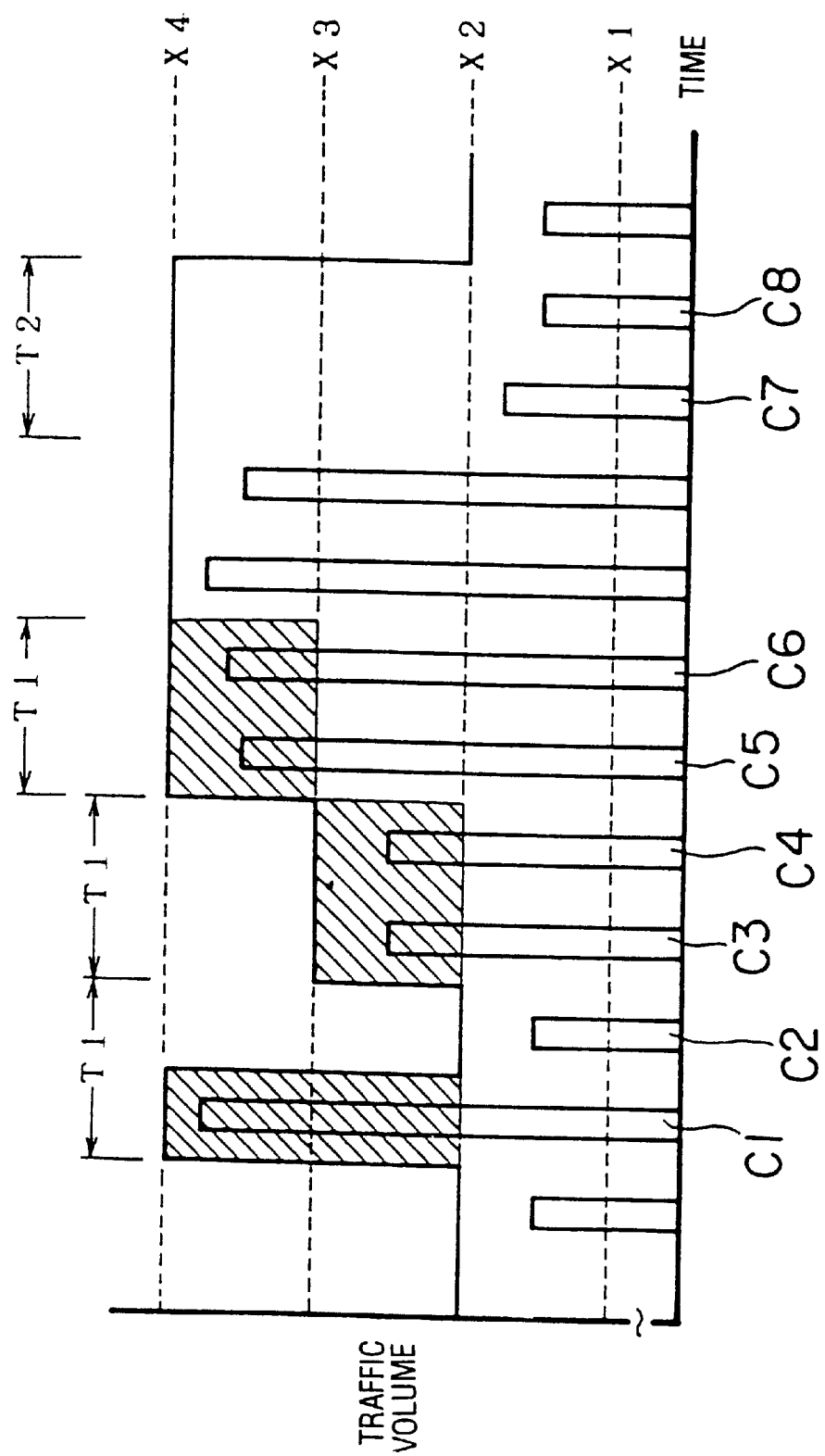
FIG. 7 is a diagram illustrating, in detail, of the manner in which the common channel capacity manager in the apparatus according to the second embodiment operates.

FIG. 7 shows, in detail, of the manner in which the common channel capacity manager according to the second embodiment operates. It is assumed that the channel capacity to which the common signal channel has previously been set is represented by a threshold X2 and exists in the steadily maintained region. If the traffic volume in the common signal channel exceeds the threshold X2 (C1), then since the traffic volume lies between thresholds X3, X4 in FIG. 7, the common channel capacity manager sets the channel capacity of the common signal channel to the threshold X4. The increase in the channel capacity is established in the temporarily maintained region (shown hatched in FIG. 7). At the same time, the common channel capacity manager starts a capacity steadying timer to measure a capacity steadying time T1. If the traffic volume in the common signal channel is lowered below the threshold X2 before the capacity steadying timer fully measures the capacity steadying time T1 (C2), then the common channel capacity manager sets the channel capacity of the common signal channel back to the threshold X2 and cancels the channel capacity established in the temporarily maintained region.

If the traffic volume in the common signal channel thereafter exceeds the threshold X2 (C3), then since the traffic volume lies between thresholds X2, X3 in FIG. 7, the common channel capacity manager sets the channel capacity of the common signal channel to the threshold X3. The increase in the channel capacity is established in the temporarily maintained region (shown hatched in FIG. 7). At the same time, the common channel capacity manager starts the capacity steadying timer to measure the capacity steadying time T1. The traffic volume in the common signal channel remains between the thresholds X2, X3 after the capacity steadying timer has fully measured the capacity steadying time T1 (C4). Therefore, the common channel capacity manager keeps setting the channel capacity of the common signal channel to the threshold X3 and expands the steadily maintained region up to the threshold X3.

If the traffic volume in the common signal channel thereafter exceeds the threshold X3 (C5), then since the traffic volume lies between thresholds X3, X4 in FIG. 7, the common channel capacity manager sets the channel capacity of the common signal channel to the threshold X4. The increase in the channel capacity is established in the temporarily maintained region (shown hatched in FIG. 7). At the same time, the common channel capacity manager starts the capacity steadying timer to measure the capacity steadying time T1. The traffic volume in the common signal channel remains between the thresholds X3, X4 after the capacity steadying timer has fully measured the capacity steadying time T1 (C6). Therefore, the common channel capacity manager keeps setting the channel capacity of the common signal channel to the threshold X4 and expands the steadily maintained region up to the threshold X4.

If the traffic volume in the common signal channel thereafter drops below the threshold X3 (C7), then the common channel capacity manager keeps the channel capacity of the common signal channel at the threshold X4, and starts a steady capacity reducing timer to measure a steady capacity reducing time T2. If the traffic volume in the common signal channel exceeds the threshold X3 before the steady capacity reducing timer fully measures the steady capacity reducing time T2, then common channel capacity manager maintains the present channel capacity of the common signal channel. If the traffic volume in the common signal channel remains below the threshold X3 after the steady capacity reducing timer has fully measured the steady capacity reducing time T2 (C8), then the common channel capacity manager reduces the channel capacity of the common signal channel, and also reduces the steadily maintained region back to its former size. Specifically, in FIG. 7, because the traffic volume in the common signal channel lies between the thresholds X1, X2 during the steady capacity reducing time T2, the common channel capacity manager sets the channel capacity of the common signal channel back to the threshold X2.

In the second embodiment, as described above, the segment for use by the common signal channel in the interoffice channel capacity includes the steadily maintained region 42 which guarantees the traffic volume in the common signal channel and the temporarily maintained region 43 which gives priority to the traffic volume in the speech channels over the traffic volume in the common signal channel for thereby effectively utilizing the interoffice channel capacity. The common channel capacity manager according to the second embodiment can operate normally even if the traffic volume suffers a burst increase or the apparatus according to the second embodiment is incorporated in a system with a relatively high interoffice traffic intensity or occupancy.

An apparatus for establishing a common signal channel according to a third embodiment of the present invention will be described below.

The apparatus according to the third embodiment has a hardware arrangement similar to that of the apparatus according to the embodiment shown in FIGS. 2 and 3. However, the common channel capacity controller 11d (see FIG. 8) in the processor 11 of the apparatus according to the third embodiment operates in a manner different from the common channel capacity controller 11d in the processor 11 of the apparatus according to the first embodiment. The components of the apparatus according to the third embodiment which are structurally and functionally identical to those of the apparatus according to the first embodiment will not be described in detail below, and those of the apparatus according to the third embodiment which are different from the apparatus according to the first embodiment will be described below.

Figure 8:
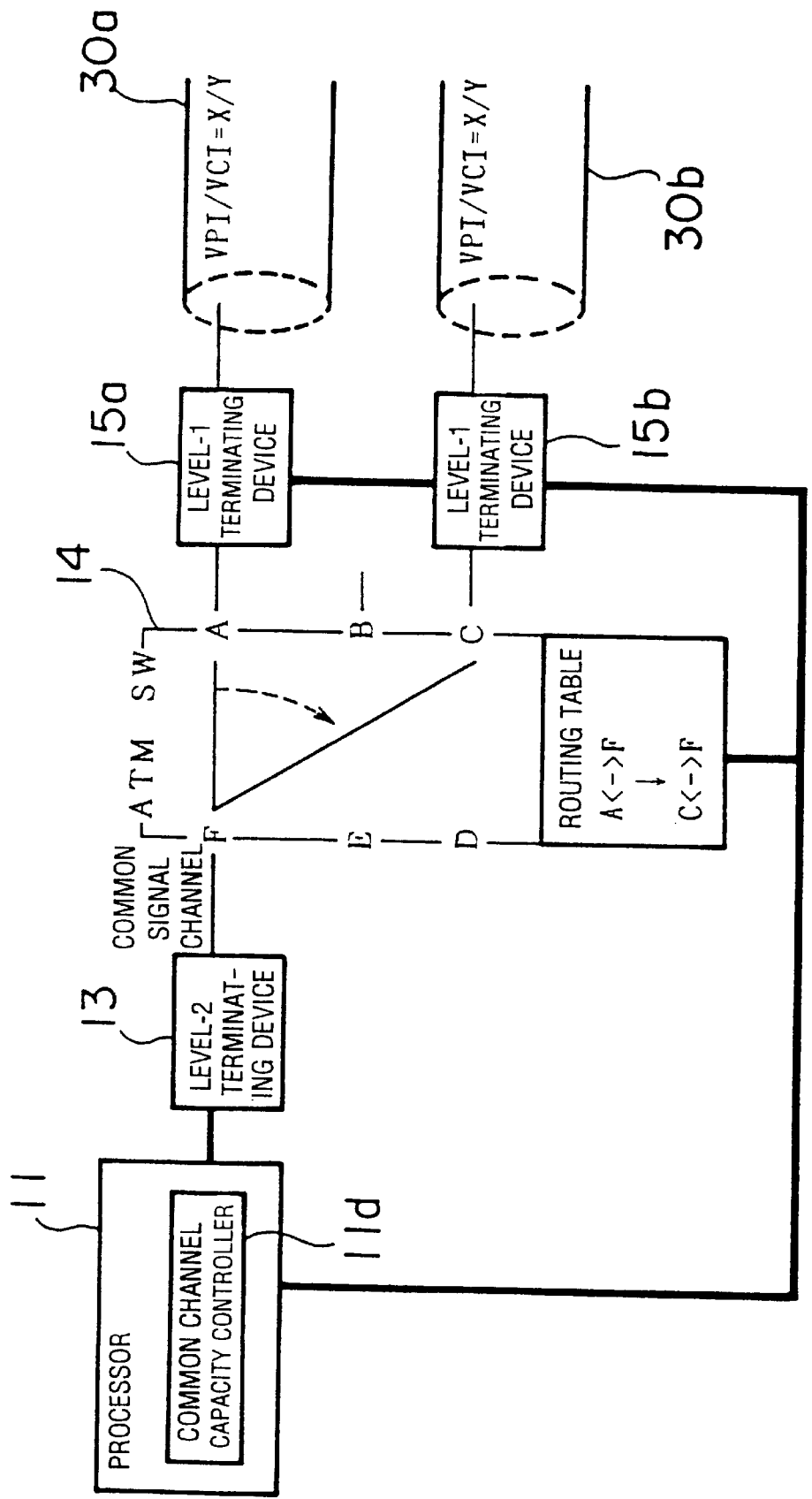
FIG. 8 is a diagram illustrative of the principles of operation of a common channel capacity controller in an apparatus for establishing a common signal channel according to a third embodiment of the present invention.

FIG. 8 shows the principles of operation of the common channel capacity controller 11d in the apparatus according to the third embodiment of the present invention. According to the third embodiment, the apparatus includes a pair of level-1 terminating devices 15a, 15b and a pair of interoffice physical cables 30a, 30b.

The ATM switch 14 normally connects the level-2 terminating device 13 and the level-1 terminating device 15a to each other, establishing a common signal channel from the level-2 terminating device 13 through the level-1 terminating device 15a to the interoffice physical cable 30a. If supplied with a decision that the channel capacity to which the common signal channel is presently set needs to be increased from the common channel capacity manager 11c, then the common channel capacity controller 11d checks a remaining empty traffic volume which is not currently used in the interoffice physical cable 30a which accommodates the common signal channel. If the remaining empty traffic volume is smaller than the difference between the channel capacity to be newly established and the presently established channel capacity, then the ATM switch 14 connects the level-2 terminating device 13 and the level-1 terminating device 15b to each other, thereby connecting the interoffice physical cable 30b which has a relatively large empty traffic volume to the level-2 terminating device 13. The ATM switch 14 is operated by rewriting a routing table from "A–F" to "C–F" as shown in FIG. 8 thereby controlling header information of an ATM cell. Since the interoffice physical cable in which the common signal channel is established is changed, it is necessary to indicate such a change to the companion exchange with which the exchange that incorporates the apparatus communicates, and also to control the exchanges to change channels. Such a process will be described below with reference to FIG. 9.

Figure 9:
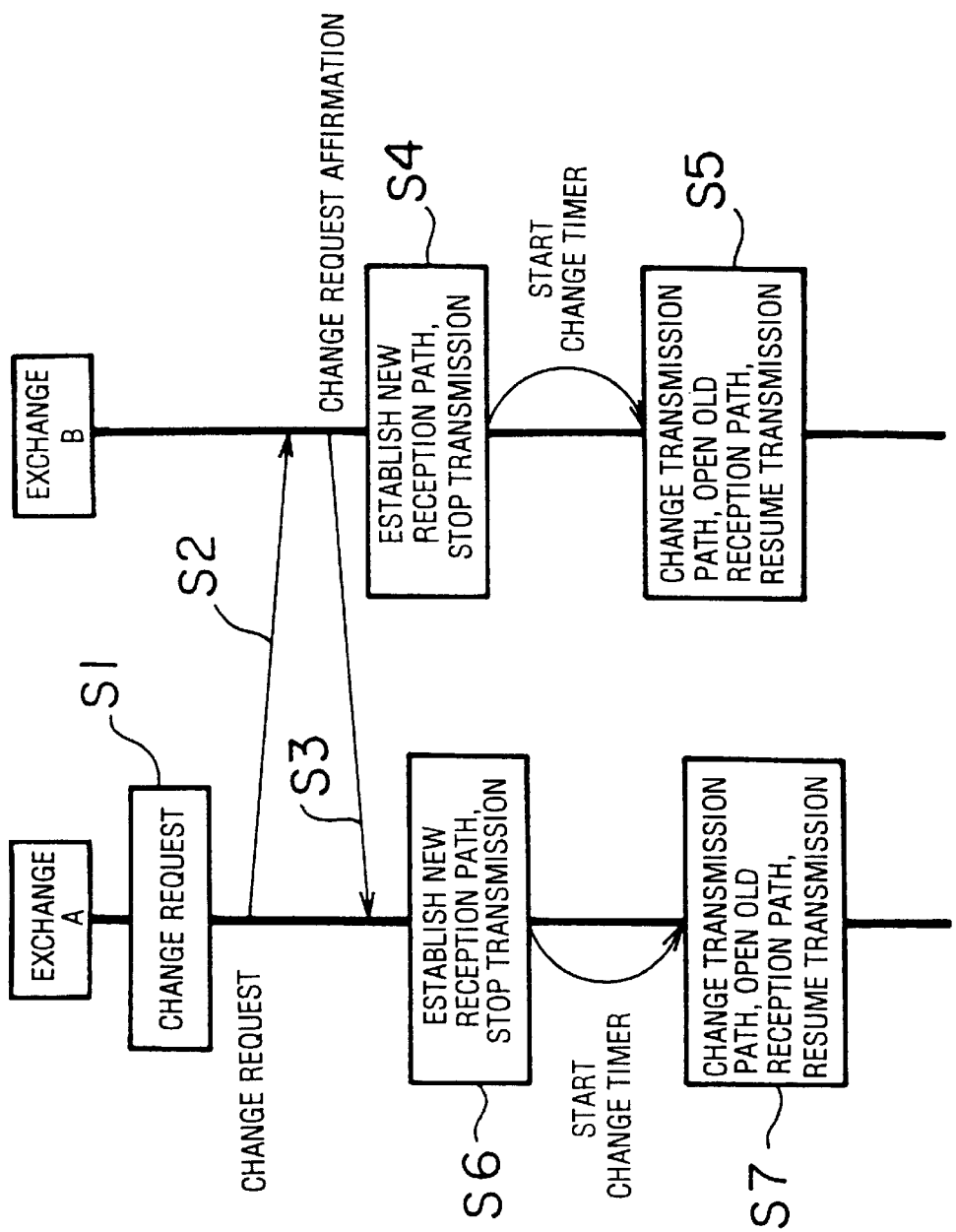
FIG. 9 is a sequence diagram of a process of changing channels in the apparatus according to the third embodiment.

FIG. 9 is a sequence diagram of a process of changing channels in the apparatus according to the third embodiment at the time the interoffice physical cable in which the common signal channel is established is changed. In FIG. 9, an exchange or station A incorporates the apparatus according to the present invention, and an exchange or station B communicates with the exchange A. Steps S1 through S7 shown in FIG. 9 will successively be described below.

[S1] An event that requires the interoffice physical cable in which the common signal channel is established to be changed occurs in the exchange A.

[S2] When the event occurs, the exchange A sends a change request message to the exchange B. The change request message contains the number of an interoffice physical cable to be newly used, a VPI, a VCI, and a channel capacity to be established.

[S3] The exchange B checks if channels can be changed as requested by the exchange A. If channels can be changed, then the exchange B sends a change request affirmation message to the exchange A.

[S4] At the same time that the change request affirmation message is sent, the exchange B establishes a new reception path, and stops transmission. The exchange B also starts a change timer to measure a predetermined time.

[S5] When the change timer reaches timeout, the exchange B switches the transmission path to a new interoffice physical cable, opens the old reception path, and resumes transmission.

[S6] In response to the change request affirmation message from the exchange B, the exchange A establishes a new reception path, and stops transmission. The exchange A also starts a change timer to measure a predetermined time.

[S7] When the change timer reaches timeout, the exchange A switches the transmission path to the new interoffice physical cable, opens the old reception path, and resumes transmission.

According to the third embodiment, the apparatus can meet a request for increasing the channel capacity to which the common signal channel is set even if any remaining empty traffic volume in the interoffice physical cable 30a which is normally used is small.

The common channel capacity controller 11d in the apparatus according to the third embodiment may be employed as the common channel capacity controller in the apparatus according to the second embodiment.

An apparatus for establishing a common signal channel according to a fourth embodiment of the present invention will be described below.

The apparatus according to the fourth embodiment has a hardware arrangement similar to that of the apparatus according to the embodiment shown in FIGS. 2 and 3. However, the common channel capacity controller 11d (see FIG. 10) in the processor 11 of the apparatus according to the fourth embodiment operates in a manner different from the common channel capacity controller 11d in the processor 11 of the apparatus according to the first embodiment. The components of the apparatus according to the fourth embodiment which are structurally and functionally identical to those of the apparatus according to the first embodiment will not be described in detail below, and those of the apparatus according to the fourth embodiment which are different from the apparatus according to the first embodiment will be described below.

Figure 10:
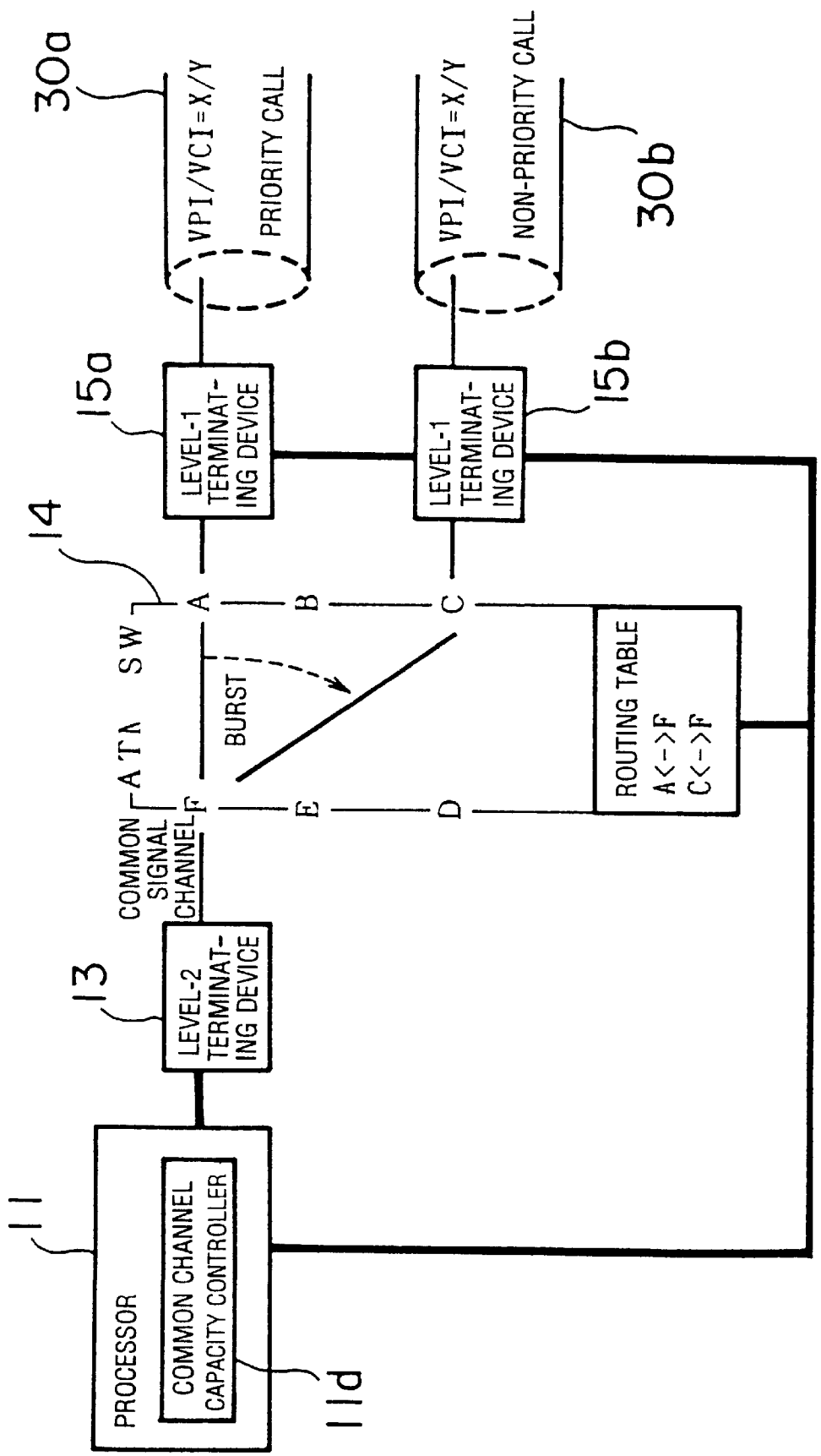
FIG. 10 is a diagram illustrative of the principles of operation of a common channel capacity controller in an apparatus for establishing a common signal channel according to a fourth embodiment of the present invention.

FIG. 10 shows the principles of operation of the common channel capacity controller 11d in the apparatus according to the fourth embodiment of the present invention. According to the fourth embodiment, the apparatus includes a pair of level-1 terminating devices 15a, 15b and a pair of interoffice physical cables 30a, 30b. The interoffice physical cable 30a has a common signal channel established in the steadily maintained region, and the interoffice physical cable 30b has a common signal channel reserved in the temporarily maintained region. A VPI/VCI number of the common signal channel reserved in the interoffice physical cable 30b is equalized to a VPI/VCI number (X/Y) of the common signal channel established in the interoffice physical cable 30a. If the channel capacity of the common signal channel is established in the steadily maintained region, then the channel capacity of the common signal channel will not be transferred to the speech channels even when the speech channels have an insufficient channel capacity. However, if the channel capacity of the common signal channel is established in the temporarily maintained region, then it will be transferred to the speech channels when the speech channels have an insufficient channel capacity. Therefore, priority is given to the speech channels in the temporarily maintained region.

Built-in channel capacity monitors in the level-1 terminating devices 15a, 15b are initialized in advance. Then, a path is established to connect the level-2 terminating device 13 to the level-1 terminating devices 15a, 15b. The companion exchange is also requested to carry out this preceding process.

The ATM switch 14 normally connects the level-2 terminating device 13 and the level-1 terminating device 15a to each other, establishing a common signal channel from the level-2 terminating device 13 through the level-1 terminating device 15a to the interoffice physical cable 30a. If supplied with a decision that the channel capacity to which the common signal channel is presently set needs to be increased from the common channel capacity manager 11c, then the common channel capacity controller 11d checks a remaining empty traffic volume which is not currently used in the interoffice physical cable 30a which accommodates the common signal channel. If the remaining empty traffic volume is smaller than the difference between the channel capacity to be newly established and the presently established channel capacity, then the ATM switch 14 connects the level-2 terminating device 13 and the level-1 terminating device 15b to each other while keeping the level-2 terminating device 13 connected to the level-1 terminating device 15a. The ATM switch 14 is operated by rewriting a routing table for "A–F and C–F" as shown in FIG. 10 thereby controlling header information of an ATM cell.

In the fourth embodiment, the common signal channel in the interoffice physical cable 30a and the common signal channel in the interoffice physical cable 30b have already been established. Therefore, even when supplied with a decision that the channel capacity to which the common signal channel is presently set needs to be increased, it is not necessary to change channels between the exchanges. Therefore, the common signal channels can quickly be switched from one to the other.

The common channel capacity controller 11d in the apparatus according to the fourth embodiment may be employed as the common channel capacity controller in the apparatus according to the second embodiment.

An apparatus for establishing a common signal channel according to a fifth embodiment of the present invention will be described below.

The apparatus according to the fifth embodiment has a hardware arrangement similar to that of the apparatus according to the embodiment shown in FIGS. 2 and 3. However, the common channel capacity controller 11d (see FIG. 11) in the processor 11 of the apparatus according to the fifth embodiment operates in a manner different from the common channel capacity controller 11d in the processor 11 of the apparatus according to the first embodiment. The components of the apparatus according to the fifth embodiment which are structurally and functionally identical to those of the apparatus according to the first embodiment will not be described in detail below, and those of the apparatus according to the fifth embodiment which are different from the apparatus according to the first embodiment will be described below.

Figure 11:
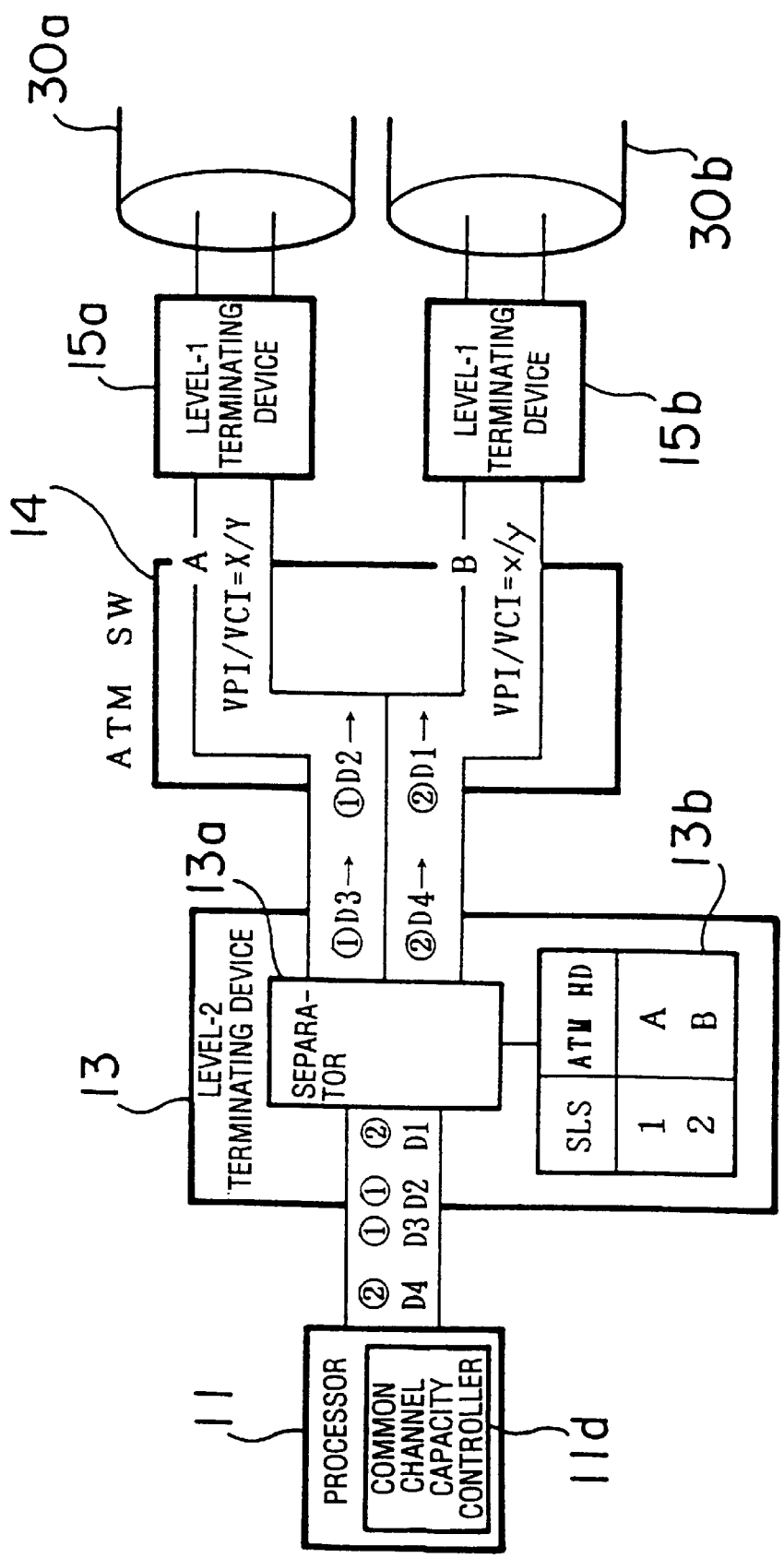
FIG. 11 is a diagram illustrative of the principles of operation of a common channel capacity controller in an apparatus for establishing a common signal channel according to a fifth embodiment of the present invention.

FIG. 11 shows the principles of operation of the common channel capacity controller 11d in the apparatus according to the fifth embodiment of the present invention. According to the fifth embodiment, the apparatus includes a pair of level-1 terminating devices 15a, 15b and a pair of interoffice physical cables 30a, 30b. A VPI/VCI number (X/Y) is established as a common signal channel in the interoffice physical cable 30a, and a VPI/VCI number (x/y) is established as a common signal channel in the interoffice physical cable 30b. A routing table for the ATM switch 14 is generated to connect the level-2 terminating device 13 and the common signal channels in the interoffice physical cables 30a, 30b to each other.

A signal rink selection number SLS is added to a call control signal which is outputted from the processor 11. Using the signal rink selection number SLS, a separator 13a in the level-2 terminating device 13 is capable of assigning call control signals to a path A and a path B by referring to an SLS/ATM header conversion table 13b. The path A extends from the ATM switch 14 through the level-1 terminating device 15a to the interoffice physical cable 30a, and the path B extends from the ATM switch 14 through the level-1 terminating device 15b to the interoffice physical cable 30b.

Usually, the SLS/ATM header conversion table 13b has settings for sending call control signals to the path A irrespective of the signal rink selection number SLS. Therefore, the common signal channel established in the interoffice physical cable 30a is normally used. If supplied with a decision that the channel capacity to which the common signal channel is presently set needs to be increased from the common channel capacity manager 11c, then the SLS/ATM header conversion table 13b is changed to the data shown in FIG. 11. Based on the changed SLS/ATM header conversion table 13b, a call control signal with SLS1 added is sent to the path A, whereas a call control signal with SLS2 added is sent to the path B. Therefore, a call control signal D1 with SLS2 (indicated by ② in FIG. 11) is sent to the path B, whereas a call control signal D2 with SLS1 (indicated by ① in FIG. 11) is sent to the path A. Therefore, when the channel capacity to which the common signal channel is set needs to be increased, the common signal channels established in the interoffice physical cables 30a, 30b are used.

Since the interoffice physical cable in which the common signal channel is established is changed, it is necessary to indicate such a change to the companion exchange with which the exchange that incorporates the apparatus communicates, and also to control the exchanges to change channels. Such a process will be described below with reference to FIGS. 12 and 13.

Figure 12:
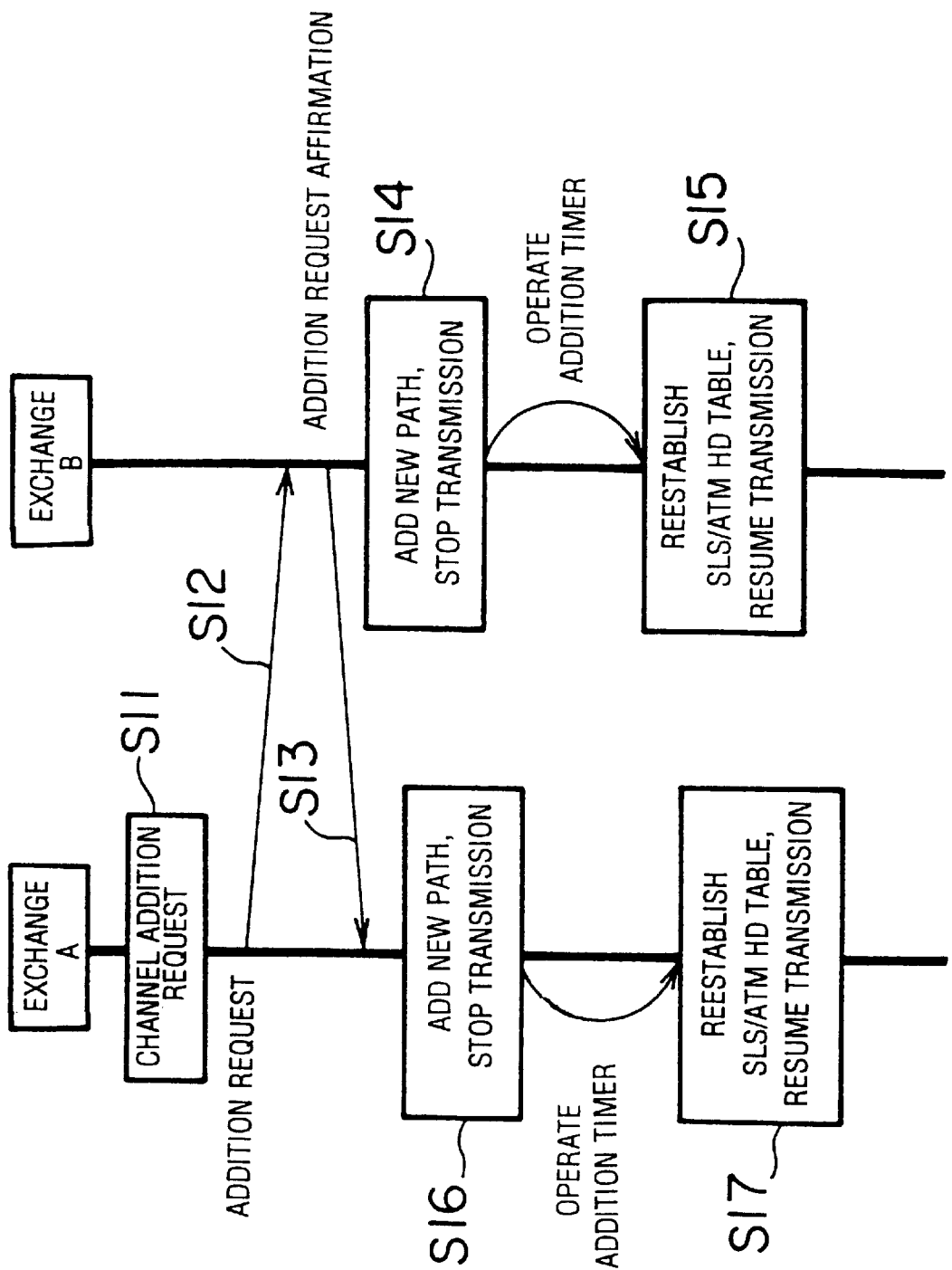
FIG. 12 is a sequence diagram of a process of increasing interoffice physical cables in which common signal channels are established in the apparatus according to the fifth embodiment.

FIG. 12 is a sequence diagram of a process of adding interoffice physical cables in which common signal channels are established in the apparatus according to the fifth embodiment. In FIG. 12, an exchange or station A incorporates the apparatus according to the present invention, and an exchange or station B communicates with the exchange A. Steps S11 through S17 shown in FIG. 12 will successively be described below.

[S11] An event that requires the channel capacity of a common signal channel between the exchanges A and B to be increased occurs in the exchange A.

[S12] When the event occurs, the exchange A sends an addition request message indicating that an interoffice physical cable are to be added to the exchange B. The addition request message contains the number of an interoffice physical cable to be added, a VPI, a VCI, and a channel capacity to be established.

[S13] The exchange B checks if an interoffice physical cable can be added as requested by the exchange A. If an interoffice physical cable can be added, then the exchange B sends an addition request affirmation message to the exchange A.

[S14] At the same time that the addition request affirmation message is sent, the exchange B establishes a new path, and stops transmission. The exchange B also starts an addition timer to measure a predetermined time.

[S15] When the increase timer reaches timeout, the exchange B reestablishes the SLS/ATM header conversion table 13b in order to use the interoffice physical cable which has been added, and resumes transmission.

[S16] In response to the increase request affirmation message from the exchange B, the exchange A establishes a new path, and stops transmission. The exchange A also starts an addition timer to measure a predetermined time.

[S17] When the increase timer reaches timeout, the exchange A reestablishes the SLS/ATM header conversion table 13b in order to use the interoffice physical cable which has been added, and resumes transmission.

Figure 13:
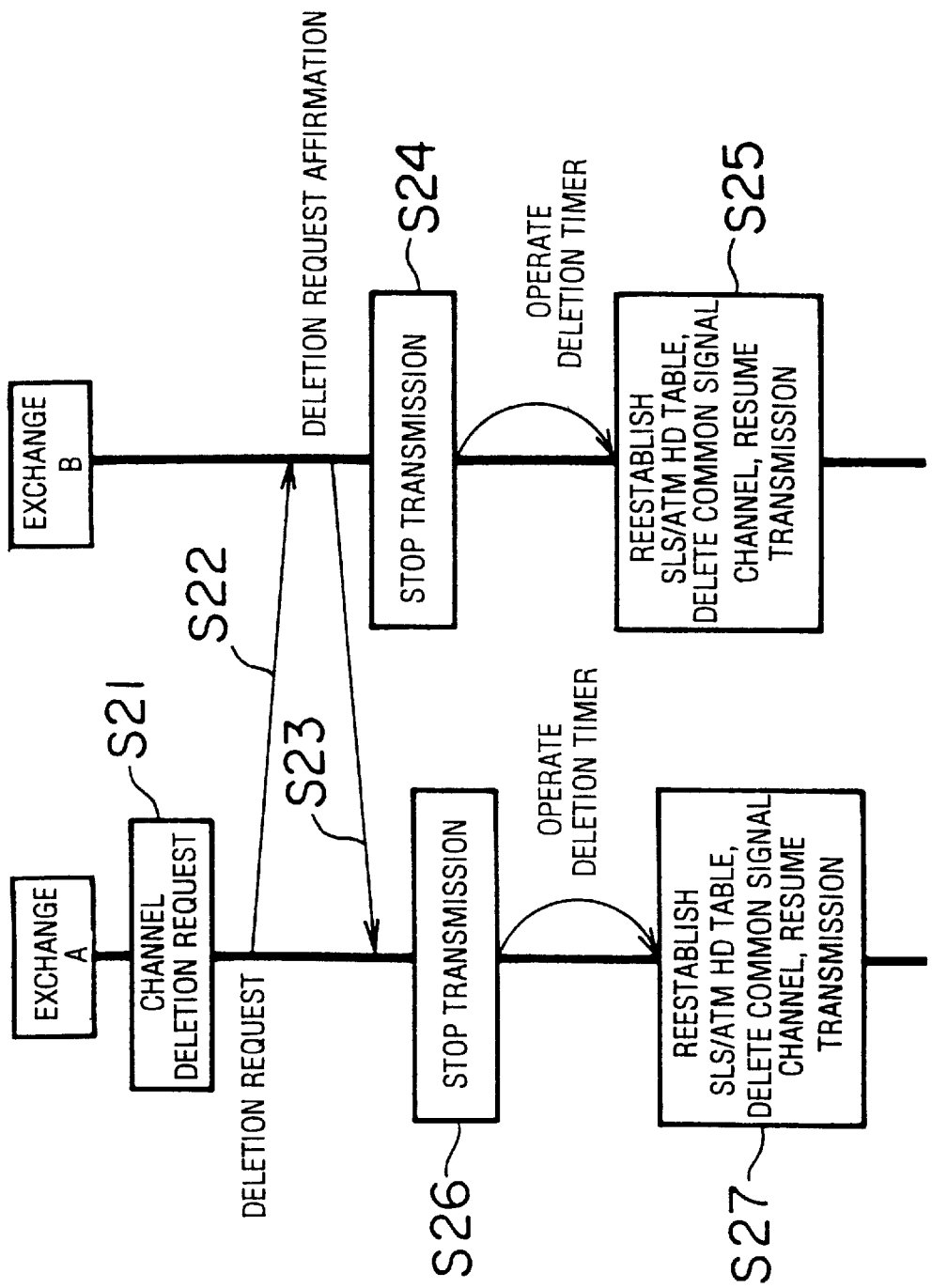
FIG. 13 is a sequence diagram of a process of reducing interoffice physical cables in which common signal channels are established in the apparatus according to the fifth embodiment.

FIG. 13 is a sequence diagram of a process of deleting interoffice physical cables in which common signal channels are established in the apparatus according to the fifth embodiment. Steps S21 through S27 shown in FIG. 13 will successively be described below.

[S21] An event that requires the channel capacity of a common signal channel to be reduced occurs in the exchange A.

[S22] When the event occurs, the exchange A sends a deletion request message indicating that an interoffice physical cables are to be deleted to the exchange B. The deletion request message contains the number of an interoffice physical cable to be deleted, a VPI, a VCI, and a channel capacity to be established.

[S23] The exchange B checks if an interoffice physical cable can be deleted as requested by the exchange A. If an interoffice physical cable can be deleted, then the exchange B sends a deletion request affirmation message to the exchange A.

[S24] At the same time that the deletion request affirmation message is sent, the exchange B establishes a new path, and stops transmission. The exchange B also starts a deletion timer to measure a predetermined time.

[S25] When the deletion timer reaches timeout, the exchange B reestablishes the SLS/ATM header conversion table 13b in order not to use the interoffice physical cable which has been deleted, and resumes transmission.

[S26] In response to the deletion request affirmation message from the exchange B, the exchange A stops transmission. The exchange A also starts a deletion timer to measure a predetermined time.

[S27] When the deletion timer reaches timeout, the exchange A reestablishes the SLS/ATM header conversion table 13b in order not to use the interoffice physical cable which has been deleted, and resumes transmission.

The common channel capacity controller 11d in the apparatus according to the fifth embodiment may be employed as the common channel capacity controller in the apparatus according to the second embodiment.

With the present invention, as described above, the channel capacity to which the common signal channel is set is variable depending on the traffic volume in the common signal channel. Consequently, control signals transmitted through the common signal channel are prevented from being lost, and the quality of services available between two exchanges or stations is increased. Since an empty traffic volume in the common signal channel is available for communications through the speech channels, the interoffice traffic capacity is effectively utilized.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for establishing a common signal channel for transmitting control signals, between exchanges independently of a number of speech channels, the common signal channel being shared by the speech channels, comprising:

traffic volume detecting means for detecting a traffic volume in the common signal channel;

channel capacity change determining means for determining whether a channel capacity to which said common signal channel is set needs to be changed or not and determining a new channel capacity to be established, based on the traffic volume detected by said traffic volume detecting means; and channel capacity change executing means for executing a change in the channel capacity to which said common signal channel is set based on the established new channel capacity if the channel capacity to which the common signal channel is set needs to be changed as determined by said channel capacity change determining means.

2. An apparatus according to claim 1, wherein said channel capacity change determining means comprises:

average value calculating means for calculating an average value of traffic volumes detected over a predetermined time by said traffic volume detecting means;

threshold detecting means for determining one, in which the average value calculated by said average value calculating means is present, of a plurality of regions defined by a plurality of predetermined discrete thresholds, and detecting a larger one of two thresholds which define said one of the plurality of regions in which the average value is present; and decision means for, if one of the two thresholds which is presently detected by said threshold detecting means is different from a threshold previously detected by said threshold detecting means, deciding that the channel capacity to which said common signal channel is set needs to be changed and regarding the presently detected one of the two thresholds as said new channel capacity to be established.

3. An apparatus according to claim 1, wherein said channel capacity change executing means comprises:

channel capacity increasing means for increasing the channel capacity to which said common signal channel is set using a remaining empty traffic volume which is currently unused in a physical channel which accommodates said common signal channel, based on the new channel capacity to be established which has been determined by said channel capacity change determining means.

4. An apparatus according to claim 1, wherein said channel capacity change executing means comprises:

establishing means for establishing a common signal channel in a second physical cable which is different from a first physical cable which accommodates the common signal channel which has been used, based on the new channel capacity to be established which has been determined by said channel capacity change determining means;

request transmitting means for transmitting, to an adjacent one of said exchanges, a request to change from the common signal channel which has been used to the common signal channel in said second physical cable; and change executing means for changing the common signal channel in one of said exchanges which incorporates said apparatus.

5. An apparatus according to claim 1, wherein said channel capacity change executing means comprises:

reserving means for reserving a common signal channel in a physical cable which gives non-priority to the common signal channel, different from a physical cable which accommodates the common signal channel that is normally used, and setting the reserved common signal channel to a number which is the same as a VPI/VCI number of the common signal channel that is normally used; and header information changing means for changing header information of an ATM cell and transmitting control signals through the common signal channel that is normally used and the reserved common signal channel, if the new channel capacity to be established which has been determined by said channel capacity change determining means exceeds the channel capacity of the common signal channel that is normally used.

6. An apparatus according to claim 1, wherein said channel capacity change executing means comprises:

adding means for adding a common signal channel in a second physical cable different from a first physical cable which accommodates the common signal channel that is normally used; and transmitting means for transmitting control signals to both the common signal channel that is normally used and the common signal channel added in said second physical cable, if the new channel capacity to be established which has been determined by said channel capacity change determining means exceeds the channel capacity of the common signal channel that is normally used.

7. An apparatus according to claim 6, wherein said transmitting means comprises:

assigning means in a level-2 terminating device, for assigning control signals to the common signal channel that is normally used and the common signal channel added in said said second physical cable using signal link selection numbers added to said control signals.

8. An apparatus according to claim 6, wherein said adding means comprises:

addition request transmitting means for transmitting a request to add the common signal channel in said said second physical channel to an adjacent one of the exchanges; and addition executing means for adding the common signal channel in one of said exchanges which incorporates said apparatus.

9. An apparatus for establishing a common signal channel for transmitting control signals, between exchanges independently of a number of speech channels, the common signal channel being shared by the speech channels, comprising:

traffic volume detecting means for detecting a traffic volume in the common signal channel;

channel capacity change determining means for determining whether a channel capacity to which said common signal channel is set needs to be changed or not and determining a new channel capacity to be established; based on the traffic volume detected by said traffic volume detecting means, and channel capacity change executing means for executing a chance in the channel capacity to which said common signal channel is set based on the established new channel capacity if the channel capacity to which the common signal channel is set needs to be changed as determined by said channel capacity change determining means, wherein said channel capacity change determining means comprises:

first maintaining means for, if a traffic volume presently detected by said traffic volume detecting means exceeds a first one of a plurality of predetermined discrete thresholds, deciding that the channel capacity to which said common signal channel is set needs to be temporarily changed, determining one, in which the presently detected traffic volume is present, of a plurality of regions defined by said predetermined discrete thresholds, maintaining a larger one of two thresholds which define said one of the plurality of regions in which the presently detected traffic volume is present as said new channel capacity to be established in a temporarily maintained region, and simultaneously starting a first timer to measure a first predetermined time;

canceling means for canceling said larger one of two thresholds maintained as said new channel capacity to be established in the temporarily maintained region and setting the channel capacity to which said common signal channel is set to said first one of the thresholds, if the traffic volume detected by said traffic volume detecting means is lower than said first one of the thresholds before said first timer fully measures said first predetermined time; and second maintaining means for deciding that the channel capacity to which said common signal channel is set needs to be changed and maintaining said larger one of two thresholds maintained by said first maintaining means as said new channel capacity to be established in a steadily maintained region, if the traffic volume detected by said traffic volume detecting means exceeds said first one of the thresholds after said first timer has fully measured said first predetermined time.

10. An apparatus according to claim 9, wherein said first one of the thresholds comprises a threshold maintained in said steadily maintained region.

11. An apparatus according to claim 9, wherein said channel capacity change determining means comprises:

timer starting means for starting a second timer to measure a second predetermined time if the traffic volume detected by said traffic volume detecting means is lower than a second one of the thresholds; and establishing means for deciding that the channel capacity to which said common signal channel is set needs to be changed and establishing said second one of the thresholds as said new channel capacity to be established, if the traffic volume detected by said traffic volume detecting means is lower than said second one of the thresholds after said second timer has fully measured said second predetermined time.

12. An apparatus according to claim 11, wherein said second one of the thresholds comprises a threshold smaller than a threshold previously maintained in said steadily maintained region.

13. An apparatus for establishing a common signal channel for transmitting control signals, between exchanges independently of a number of speech channels, the common signal channel being shared by the speech channels, comprising:

traffic volume detecting means for detecting a traffic volume in the common signal channel;

channel capacity change determining means for determining whether a channel capacity to which said common signal channel is set needs to be changed or not and determining a new channel capacity to be established, based on the traffic volume detected by said traffic volume detecting means; and channel capacity change executing means for executing a change in the channel capacity to which said common signal channel is set based on the established new channel capacity if the channel capacity to which the common signal channel is set needs to be changed as determined by said channel capacity change determining means, wherein said channel capacity channel executing means comprises:

adding means for adding a common signal channel in a second physical cable different from a first physical cable which accommodates the common signal channel that is normally used; and transmitting means for transmitting control signals to both the common signal channel that is normally used and the common signal channel added in said second physical cable, if the new channel capacity to be established which has been determined by said channel capacity change determining means exceeds the channel capacity of the common signal channel that is normally used, and wherein said adding means comprises:

addition request transmitting means for transmitting a request to add the common signal channel in said second physical channel to an adjacent one of the exchanges;

addition executing means for adding the common signal channel in one of said exchanges which incorporates said apparatus;

deletion request transmitting means for transmitting a request to delete the common signal channel added in said other physical channel to said adjacent one of the exchanges; and deletion executing means for deleting the common signal channel added in said one of the exchanges.

14. An apparatus for establishing a common signal channel for transmitting control signals, between exchanges independently of a number of speech channels, the common signal channel being shared by the speech channels, comprising:

traffic volume detecting means for detecting a traffic volume in a speech channel in a physical cable which accommodates the common signal channel and detecting a traffic volume in said common signal channel;

channel capacity change determining means for determining whether a channel capacity to which said common signal channel is set needs to be changed or not and determining a new channel capacity to be established, based on the traffic volumes detected by said traffic volume detecting means; and channel capacity change executing means for executing a change in the channel capacity to which said common signal channel is set based on the established new channel capacity if the channel capacity to which the common signal channel is set needs to be changed as determined by said channel capacity change determining means.

\* \* \* \* \*